United States Patent Office 3,476,449
Patented Nov. 4, 1969

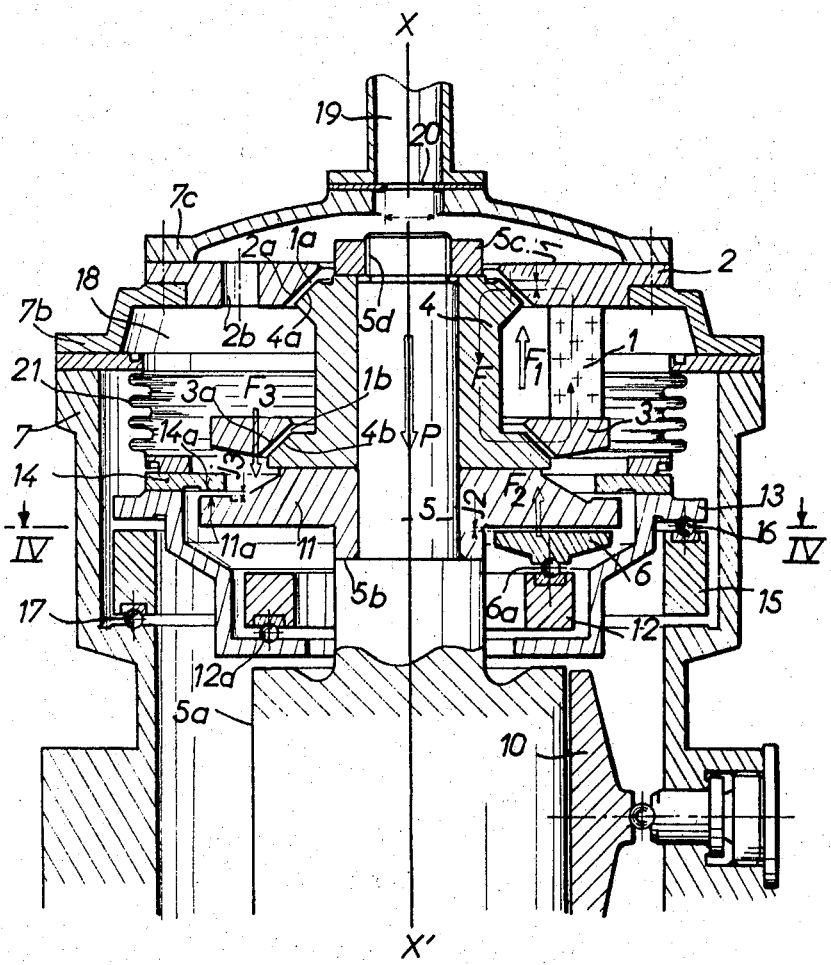

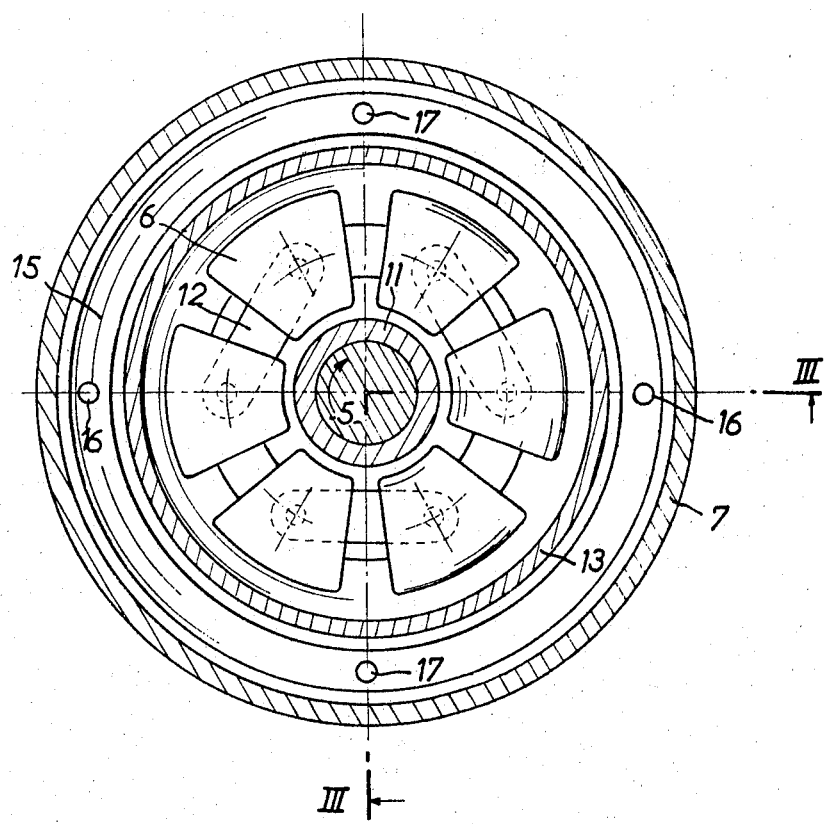
Fig.: 4

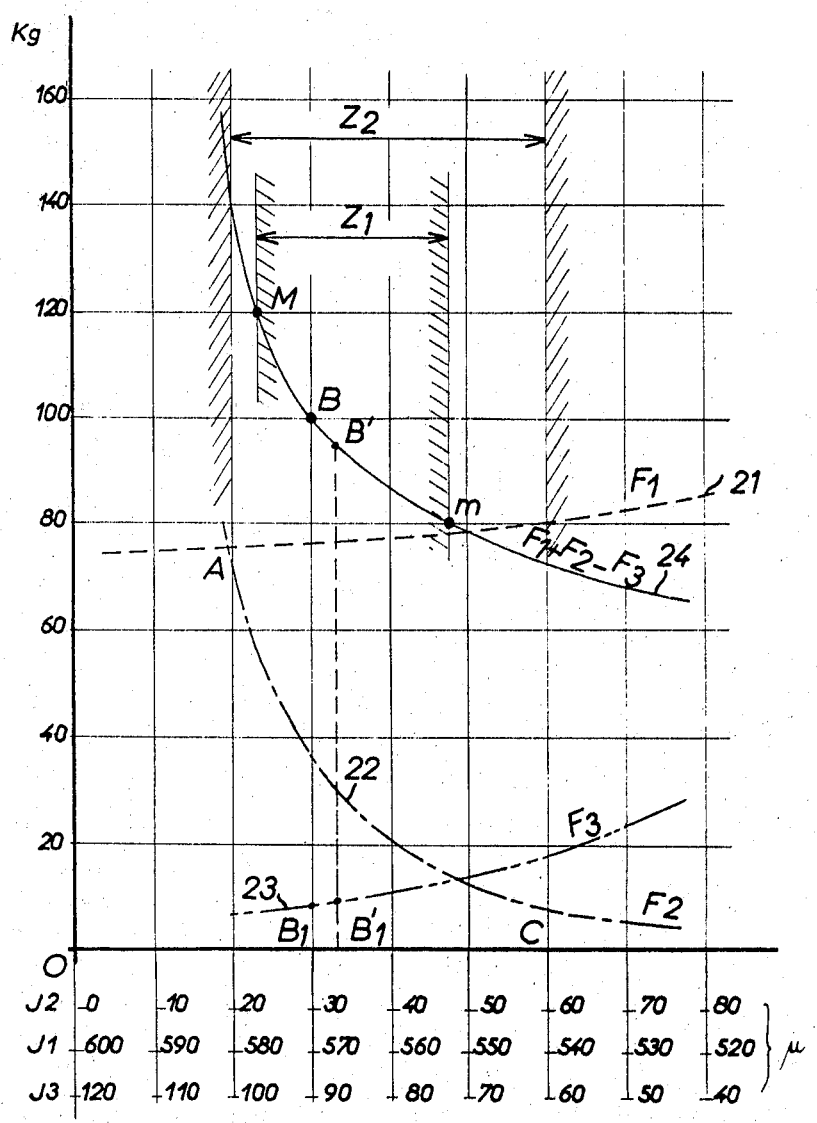

3,476,449
AXIAL THRUST DEVICES FOR
ROTATING MACHINES
Jacques Chaboseau, Brevannes, and Christian Mech,
Paris, France, Assignors to Société Rateau, Paris,
France, a company of France
Filed June 14, 1967, Ser. No. 646,069
Claims priority, application France, June 27, 1966,
67,037
Int. Cl. F16c 35/00, 39/00
U.S. Cl. 308—10                      6 Claims

ABSTRACT OF THE DISCLOSURE

An axial thrust device for rotating machines having an axially shiftable rotor mounted with some freedom of axial movement is described. The axial thrust device comprises, in combination, magnetic means adapted to exert an axially directed magnetic force on the rotor variable with the axial position thereof to roughly balance the axial forces, and counterbalancing means comprising a fluid-film thrust bearing to exert a lift force on the rotor when the rotor is operative to engender a balancing force equal to the resultant axial forces and the magnetic force to ensure a stable axial positioning of the rotor. The device has particular application in leak-proof vertical axis compressors or blowers.

Background of the invention

This invention relates to improvements in axial thrust devices for rotating machines and is more particularly though not exclusively applicable to leaktight compressors and blowers.

In certain gas circuits it is advantageous to use leaktight blowers or compressors, i.e. having no protruding shafts, in which lubrication of the rubbing parts (the journals and thrust-bearings) is performed by the fluid used in the circuit. Resistance to axial thrust of the rotor in such machines, especially when they have vertical shafts, often raises difficult problems because of the magnitude of the axial forces to be withstood.

It has already been proposed, in connection with machines of this kind, to use a magnetic force to counteract the weight and the static and dynamic reactions exerted on the rotor when the machine is operative, but it has heretofore been found impossible to devise a purely magnetic system capable of properly positioning said compound.

Summary of the invention

In accordance with the present invention, the weight and/or axial reactions of the rotor are roughly balanced by one or more magnetic forces, with fine balancing being accomplished by means of the lift force provided by one or more fluid-film thrust-bearings. Thus, these lift forces are required to withstand only a reduced axial load and their function is to position the rotor axially. Preferably, these forces are generated beneath dynamic and/or static type gas thrust pads.

A thrust device according to the present invention may comprise for example, in combination, a magnetic circuit linked to the stator of the machine, the magnetic flux of which closes through an annular member rigid with the rotor to thus absorb the major part of the weight and/or axial reactions thereof, and a dynamic and/or static effect type gas-bearing. Since, on the one hand, the axial reactions of the rotor vary with the rotation speed of the machine and, on the other, the magnetic forces and lift forces vary respectively with the air gap and the clearance beneath the pads of the gas-bearing and hence with the axial shifts of the rotor system, it is possible to operate on the different parameters of the device (adjustment of the clearances and air gaps in the halted configuration, intensity of the magnetic flux, dimensioning of the gas bearing, etc.) in order to ensure stable axial equilibrium and axial positioning of the rotating compound at all rotation speeds of the machine.

In order to improve stability or achieve it more simply, other parameters can be introduced into the device, an example being by the provision of a second gas-bearing functioning in the opposite sense to the first, or by applying an axial thrust to the rotor through the agency of a fluid pressure controlled by means of a leak rate varying with the axial position of the rotor, or else by imparting to the air gaps a conical shape of revolution about the axis of the machine, or yet again by combining these possibilities in different ways.

Brief description of the drawings

FIGURE 3 is a sectional view on the broken line III—III of FIGURE 4, showing a constructional form of a thrust-bearing for a leaktight blower or compressor.

FIGURE 4 is a section taken on the line IV—IV of FIGURE 3.

FIGURE 5 is a graph on which are plotted the different forces involved in the thrust-bearing embodiment of FIGURES 3 and 4.

Description of the preferred embodiments

Figure 1:
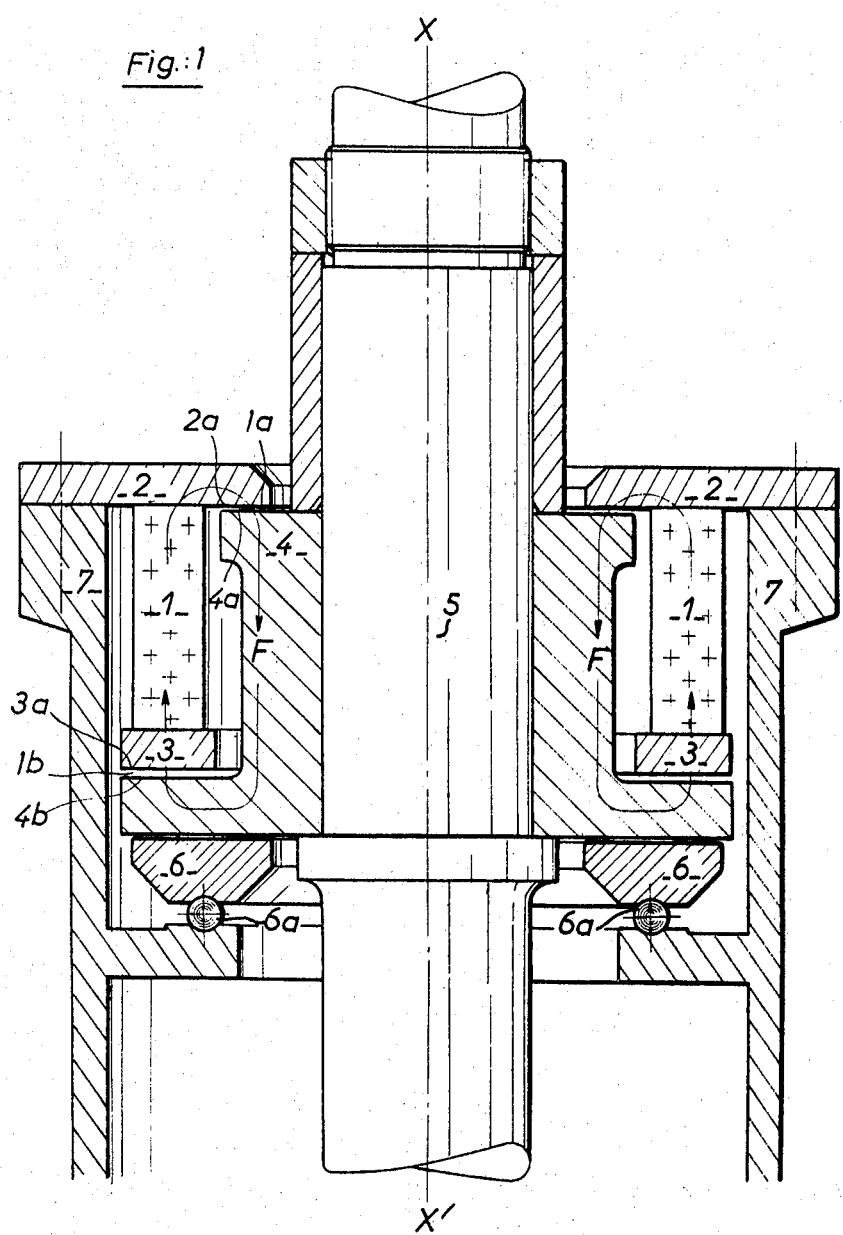
FIGURE 1 shows in schematic section an application of the invention to a thrust-bearing for a rotating machine.

FIGURE 1 shows how it is possible to combine, in accordance with the invention, a magnetic force and a dynamic lift force so as to obtain stable positioning of the vertical-axis rotor (depicted in its entirety but with its shaft shown fragmentally and designated by the reference numeral 5) of a rotary machine such as a compressor or a blower.

A magnetic flux generating system comprises a set of permanent magnets 1 arranged equidistantly about the shaft 5 and rigid with two axially spaced solid rings 2 and 3 made of magnetic metal, the whole assembly being fast with a stator member 7 of the machine. Obviously, the magnetic fluxes of all these magnets are identically orientated, so that each of rings 2 and 3 acts as a magnetic pole. It goes without saying that the set of permanent magnets 1 could be replaced by a single circular magnet.

The first ring 2 is formed on its underneath with an inwardly extending annular surface 2a which constitutes a pole face of the system. The second ring 3 is formed on its underneath with an annular surface 3a which constitutes the other pole face. Upon the shaft 5 of the rotor is mounted an annular member 4 made of magnetic metal which is formed on its top with an annular surface 4a facing the surface 2a and with an outwardly extending annular surface 4b facing the surface 3a. The magnetic flux produced by the generator system 1–2–3, depicted by the arrows F, closes through the part 4 via the air gaps 1a and 1b formed respectively between the magnetic flux receiving pole-faces 2a, 4a and 3a, 4b. This part 4 is rigid with shaft 5 and rotates therewith. Due to the continuity of the magnetic flux through the rotating parts, there are no losses caused by eddy currents.

Beneath the part 4 is arranged a set of pads 6 producing a dynamic lift effect, i.e. which in the manner well known per se utilize the pressure that is generated in operation between the parts 4 and 6 due to the viscosity of the ambient fluid. The pads 6 are supported on the stator member 7 by hinge means portrayed schematically as at 6a.

The resultant, directed along the axis XX', of the weight of the rotor and of the static and dynamic reactions of the fluid acting thereon (when the machine is operative) is absorbed by the thrust device which comprises the magnetic system 1, 2, 3, 4 and the pads 6.

In any system devised in accordance with FIGURE 1, this downwardly directed resultant will invariably be greater than the upwardly directed vertical force applied to the rotor by the magnetic flux F. As a result, the pads 6 always support part of the load regardless of whether the system is operating or not, and the reactions exerted against a rotor and said pads consequently ensure positioning of the compound. It will be explained later, with reference to FIGURE 3, how the forces in action are maintained in equilibrium and how apportionment is effected of the clearances between part 4 and rings 2 and 3 (the magnetic air gaps) and between part 4 and the supporting pads 6 (the thickness of the gas film).

Figure 2:
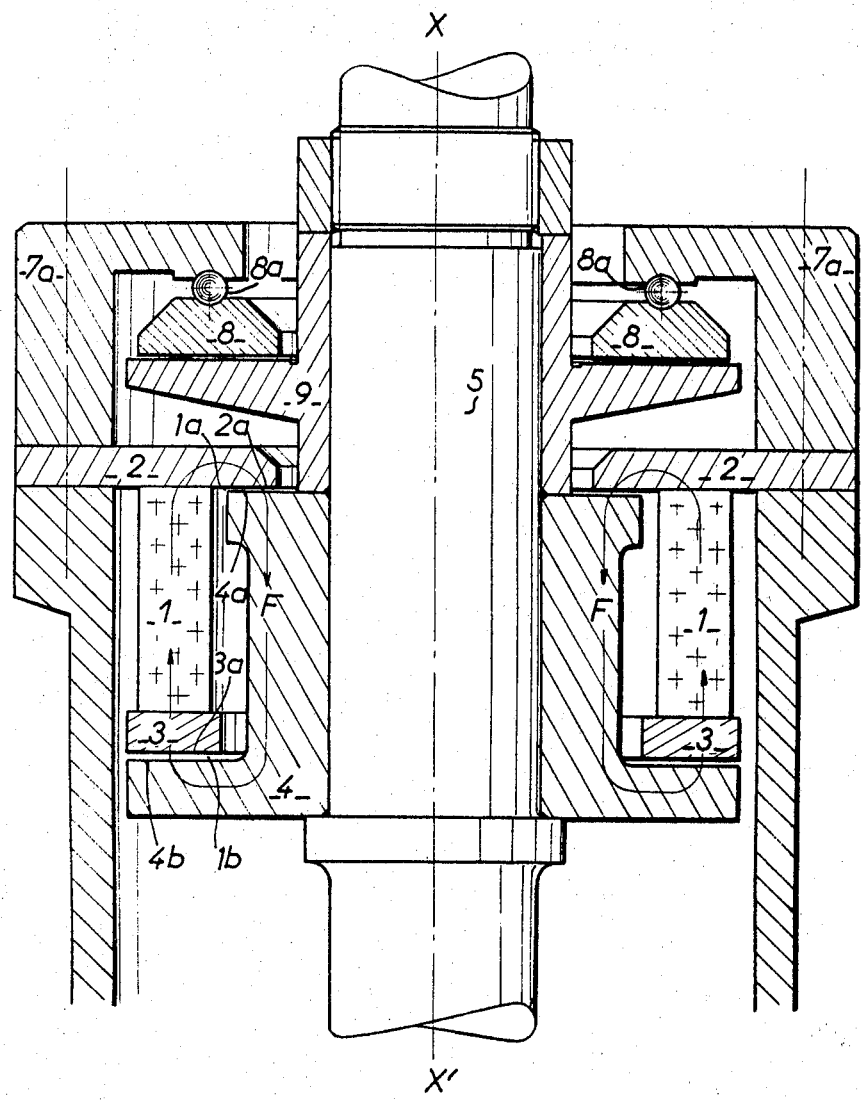
FIGURE 2 is an alternative embodiment corresponding to FIGURE 1.

FIGURE 2 shows an alternative embodiment of a thrust baring according to the invention, in which the resultant of the weight of the rotor and of the dynamic and static reactions exerted thereon is invariably less than the upwardly directed vertical force applied to part 4 by the magnetic flux, whereby the pads support the excess force of the magnetic flux.

In FIGURE 2 like parts to those of FIGURE 1 bear like reference numerals. The two rings 2 and 3 are interconnected by a set of permanent magnets 1, all of which generate a flux in the same sense, while a part 4 mounted on shaft 5 has the magnetic flux closing therethrough. Supporting pads 8 are arranged above the magnetic elements and are hingedly connected at 8a to stator member 7a and act as supporting means for a plate 9 rigid with shaft 5 so as to balance the excess force generated by the magnetic flux F over and above the weight of the rotor when the same is stopped, or over and above the resultant of this weight and of the dynamic and static reactions applied to said rotor when the same is rotating.

The purpose of FIGURES 1 and 2 is to clearly reveal the principle of the invention and how a magnetic force and a dynamic or static lifting force can be combined. It goes without saying that the specific dispositions portrayed on these figures are given for exemplary purposes only and that many changes and substitutions of parts can be made without departing from the spirit and scope of the invention. By way of example, the magnetic circuit arrangement 1, 2, 3, 4 can be replaced by any other arrangement effective in applying a magnetic force to the rotor in the required direction; further, the supporting pads 6 or 8 may operate with either a dynamic effect (as shown) or a static effect, or else may use a combination of static and dynamic effects such as is described in French Patent No. 1,478,879. The choice to be made among these possible solutions will be dictated by the pattern of change in the load on the rotor and, with the pressure-gas feed to the pads (in a static system) providing maximum scope in permissible load variation by suitably determining the relationship between the gas injection pressure and the load on the rotor.

It goes without saying also that applications of the present invention are by no means restricted to machines with vertical axes.

It would also be possible to use the arrangements of FIGURES 1 and 2 in combination, or to similarly combine the lift force provided in either of these arrangements with a thrust exerted in the opposite direction by a fluid pressure that varies with the axial location of the rotor. A further embodiment of the invention involving such a combination is illustrated for exemplary purposes in FIGURES 3 and 4, which depict a bearing designed to support a rotor weighing, say, one hundred kilograms and upon which are exerted dynamic and static axial reactions which are either added to or subtracted from the weight of the rotor, depending on the rotation speed, the limit values of these reactions being equal to plus or minus one-fifth of said weight.

It is furthermore required that at normal operating speeds the load on the dynamic pads shall be limited to one-third of the weight of the rotor, that is to thirty-three kilograms.

FIGURES 3 and 4 show the thrust-bearing assembly arranged at the top of a leaktight blower or compressor of vertical axis 5, just above the top journal bearing associated with gas-film pads 10 cooperating with a journal portion 5a on the shaft. The part of the rotor located below the journal bearing is not shown.

Parts performing like functions to those in FIGURES 1 and 2 are designated by like reference numerals but are depicted in greater detail. It is to be noted that the left and right-hand portions of FIGURE 3 are respectively sectional views through two mutually perpendicular planes defined by the broken line III—III of FIGURE 4, and that FIGURE 4 is a sectional view on a horizontal plane taken through the line IV—IV of FIGURE 3 and passing just below the pads 6, which are assumed to be horizontal.

As in the constructional form of FIGURES 1 and 2, FIGURES 3 and 4 include magnetic elements 1, 2 and 3 and the part 4 through which the flux passes. The polefaces 2a and 3a of rings 2 and 3 and the corresponding receiving faces 4a and 4b of part 4 are conical, for as is well known it is possible with such a shape to obtain a better matching of the vertical component of the magnetic forces to the required equilibrium conditions, according to the axial shift in the rotor. In particular, with such a shape two parameters additional to the air gap are made available, to wit the angle of aperture of the conical surfaces and the relative axial positions of the magnetic flux emitting parts 2 and 3 and receiving part 4. By suitably choosing these parameters it is possible to obtain a magnetic pulling force of near-constant value over the full range of possible axial shifts of the rotor during operation of the machine.

The manner in which annular part 4 is arranged is clearly shown in FIGURE 3, being clamped, against the upper surface of a thrust collar 11 seated against a shoulder 5b on shaft 5, by means of a nut 5c screwed on to the shaft end, which is accordingly formed with a screw thread as at 5d.

Stable positioning of the rotor is ensured by the dynamic lift pads 6 cooperating with the lower face of thrust collar 11. There are six such pads (see FIGURE 4) resting in pairs on levers 12 carried in turn by an annular member 13. Contact between pads 6 and levers 12 and between levers 12 and circular member 13 is ensured by balls 6a and 12a, respectively, which allow these elements to have freedom of oscillation, of equilibration of the forces, and of geometrical matching necessitated by the small clearance $j_2$ which in operation exists between collar 11 and pads 6.

Member 13, which carries in addition a disc 14 the function of which will be explained hereinafter, is itself carried by a matching device comprising primarily a ring 15. Member 13 is carried on ring 15 through the medium of two diametrically opposed balls 16, and ring 15 rests on two diametrically opposed balls 17 which bear in turn against stator member 7, the vertical planes containing balls 16 and 17, respectively, being mutually perpendicular so as to provide a universal joint effect.

The end of the stator is enclosed in a cover 7c to which a gas inlet 19 debouches through a constriction 20. Ring 2 is formed with openings 2b therein, whereby the top of the thrust-bearing constitutes a chamber 18 bounded at the top by cover 7c and at the bottom by the clearance $j_3$ formed between an annular surface 11a of collar 11 and an annular surface 14a on the lower face of disc 14. In order to further enhance leaktightness of chamber 18, disc 14 is connected to the stator through an elastic membrane 21. Chamber 18 can be set under pressure by the gas inlet 19. Upon delivery into chamber 18 (after being damped by throttling through the constriction 20) the gas flows into the machine through clearance $j_3$. The resulting pressure in chamber 18 applies a force $F_3$ to the rotor.

For a proper appreciation of the theory of operation of the embodiment of FIGURES 3 and 4 it is thought to be necessary to give a concrete example involving arbitrary values, in order to clearly demonstrate how the forces in play are kept in stable equilibrium. Clearly, these particular numerical values in no way limit the present invention.

The forces involved are:
On the one hand,

A force P which, when the machine is stopped, is equal to the weight of the rotor and, when the machine is running, is the resultant of that weight and of the vertical reactions exerted on the rotor;
and on the other hand, A magnetic force $F_1$ opposed to the force P and applied to part 4 by magnetic system 1-2-3, its magnitude varying with the axial location of the rotor, i.e. with the clearance $j_1$ (FIGURE 3) forming the air gap $1a$ as measured axially between faces $2a$ and $4a$;

A force $F_2$ likewise opposed to the weight of the rotor and resulting from the gas pressure exerted as well known per se on pads 6 when the machine is running, which force $F_2$ determines the thickness of the gas film between the lower surface of collar 11 and the pads 6, and the magnitude of clearance $j_2$;

And a force $F_3$ which adds itself to the weight of the rotor and results from the pressure prevailing in chamber 18, which pressure diminishes with increasing clearance $j_3$ due to the constriction 20.

The state of equilibrium of these forces is expressed by the relation:

$$(P+F_3)-(F_1+F_2)=0$$

or $$P=F_1+F_2-F_3$$

and it will be shown that providing the different parameters are judiciously chosen, stable equilibrium can be achieved within determinate utilisation limits.

Three operating speeds must be considered, each characterized by the value of the related clearance $j_2$ (which is null when the machine is stopped), to wit:

(a) The operating speed for minimum film thickness, having regard for the surface condition of the mutually opposed collar 11 and pads 6, for instance:

$$j_2=20\mu$$

(b) The operating speed for normal film thickness, for instance:

$$j_2=30\mu$$

(c) The operating speed for maximum thickness compatible with stability of the film, for instance:

$$j_2=60\mu$$

From the analysis of the problem given hereinbefore it will be seen that $F_2=33$ kg. Accordingly, pads 6 must be designed so that this force is obtained with the normal film thickness, i.e. with $j_2=30\mu$. It is furthermore well known to the specialist in the art that with such pads a film thickness of $20\mu$ will engender a force of about 70 kg. and that a film thickness of $60\mu$ will reduce this force to about 9 kg.

Moreover, the clearances $j_1$ and $j_3$ can and must greatly exceed $j_2$ in order that the latter shall invariably determine the position of the rotor.

In the case of the exmple chosen herein, the following values would be assumed with the machine stopped:
$j_1=600\mu$ and $j_3=120\mu$, so that when the machine is running, $j_1=(600-j_2)$ and $j_3=(120-j_2)\mu$.

On the basis of these $j_1$ and $j_3$ values it is possible to devise, on the one hand, a magnetic system 1-2-3-4 and, on the other, a feed pressure ahead of constriction 20 and a section for this constriction such that the values of $F_1$ and $F_3$ given on the graph of FIGURE 5 are obtained On this graph, the clearances $j_1$, $j_2$ and $j_3$ measured in microns are plotted along the abscissa and the forces measured in kilograms are plotted along the ordinate. Curves 21, 22 and 23 respectively represent the values of the forces $F_1$, $F_2$ and $F_3$ as a function of the axial location of the rotor, i.e. as a function of the clearances $j_1$ $j_2$ and $j_3$ upon which they respectively depend. Curve 24 plots the corresponding values of the resultant $$F_1+F_2-F_3$$

required to balance the force P at the operating speeds referred to hereinbefore. It may be seen in particular that, at the normal operating speed dealt with hereinbefore under paragraph (b), the operating point of the thrust-bearing device, identified by the point B on curve 24, corresponds to a clearance $j_2$ of $30\mu$ and a lift force $F_2$ of 33 kg.

It has already been pointed out that the problem consists in balancing the force P, which in operation may vary by one-fifth more or less than the weight of the rotor (100 kg.), i.e. between a maximum of 120 kg. and a minimum of 80 kg. The points M and m on curve 24 corresponding to these two limits bound the utilization envelope $Z_1$ of the thrust-bearing device of this invention. Points A and C on curve $F_2$, corresponding respectively to the $j_a$ values defining the limit operating speeds mentioned hereinbefore under paragraphs (a) and (c), establish the limits of the stability envelope $Z_2$ for dynamic operation of the pads 6. It will be seen that the utilization envelope $Z_1$ lies between the limits of the stability envelope $Z_2$, and furthermore that, within the latter-mentioned envelope, a shift in the rotor, for instance upwardly from $B_1$ to $B'_1$, will reduce the resultant $F_1+F_2-F_3$ of the lift forces from B to B', and that conversely a downward shift will cause said resultant to increase, whereby the required stable equilibrium is achieved.

We claim:

1. In a rotary machine having an axially shiftable rotor subjected, in operation at least, to axially directed forces, an axial thrust device comprising magnetic means adapted to exert on said rotor an axially directed magnetic force variable with the axial position thereof whereby to roughly balance the axial forces, and balancing means comprising fluid-film thrust means adapted to exert a lift force on said rotor when the same is operative and thereby engender a balancing force which is effective in equilibrating the resultant of said axial forces and said magnetic force and in ensuring stable axial positioning of said rotor, said magnetic means including magnetic flux generating means rigid with a stationary portion of the machine and surrounding part of said rotor, said generating means having a pair of axially spaced annular pole-surfaces facing the same end of said rotor, and an annular part made of magnetic substance rigid with said rotor and having a pair of magnetic flux receiving annular surfaces respectively facing said pole-surfaces whereby to form a magnetic circuit having a pair of annular air gaps.

2. A rotary machine as claimed in claim 1, wherein said pole-surfaces are formed respectively on two solid rings made of magnetic substance between which are disposed a plurality of permanent magnets spaced equidistantly around said rotor whereby to form with said rings the said magnetic flux generating means.

3. A rotary machine as claimed in claim 1, wherein said pole-surfaces are formed respectively on two solid rings made of magnetic substance between which is positioned an annular permanent magnet surrounding said rotor whereby to form with said rings the said magnetic flux generating means.

4. A rotary machine as claimed in claim 1, wherein said pole-surfaces and said cooperating receiving surfaces are conical.

5. In a rotary machine having an axially shiftable rotor mounted with some freedom of axial movement and subjected, in operation at least, to axially directed forces, an axial thrust device comprising in combination, magnetic means to exert on said rotor an axially directed magnetic force variable with the axial position thereof to roughly balance the axial forces, and balancing means comprising fluid-film thrust means to exert a lift force on said rotor when the same is operative, engendering a balancing force equal to the resultant of said axial forces and said magnetic force to ensure a stable axial positioning of said rotor, said balancing means include means for generating a fluid pressure governed by the axial position of said rotor and for applying the same to said rotor and thereby subjecting the same to an axial force which is effective in forming the balancing force jointly with the lift force.

6. In a rotary machine having a stator and a rotor axially shiftable therein and subjected, in operation at least, to axially directed forces, an axial thrust device comprising magnetic means adapted to exert on said rotor an axially-directed magnetic force variable with the axial position thereof whereby to roughly balance the axial forces, and means for balancing in operation the resultant of said axial forces and said magnetic force, comprising a radially extending annular rotor member and forming a bearing surface and a first discharge surface extending respectively towards the opposite axial ends of said rotor, a universally jointed annular member mounted in said stator and having a thrust surface facing and spaced from said bearing surface and a second discharge surface cooperating with said first discharge surface whereby to form therebetween a clearance variable with the axial position of said rotor, pads bearing on said thrust surface and adapted to cooperate with said bearing surface whereby to form a gas-film bearing, means for forming in the stator a chamber bounded by said rotor member and said annular member, and means including a construction for supplying said chamber with pressure-fluid, whereby the fluid escapes from said chamber through said clearance and produces therein a pressure which varies with the axial position of said rotor and exerts an axial force on said member rigid with said rotor.

References Cited

UNITED STATES PATENTS

| | | | |
|---|---|---|---|
| 2,436,939 | 3/1948 | Schug | 308—10 |
| 2,736,825 | 2/1956 | Hill | 310—87 |
| 3,356,425 | 12/1967 | Carriere | 310—90 |

FOREIGN PATENTS

| | | |
|---|---|---|
| 1,030,508 | 5/1960 | Great Britain. |

MILTON O. HIRSHFIELD, Primary Examiner

R. SKUDY, Assistant Examiner